Oct. 9, 1934.  H. B. TUTHILL ET AL  1,976,048
MOTOR DRIVEN LATHE HEAD
Filed Dec. 28, 1931   2 Sheets-Sheet 2

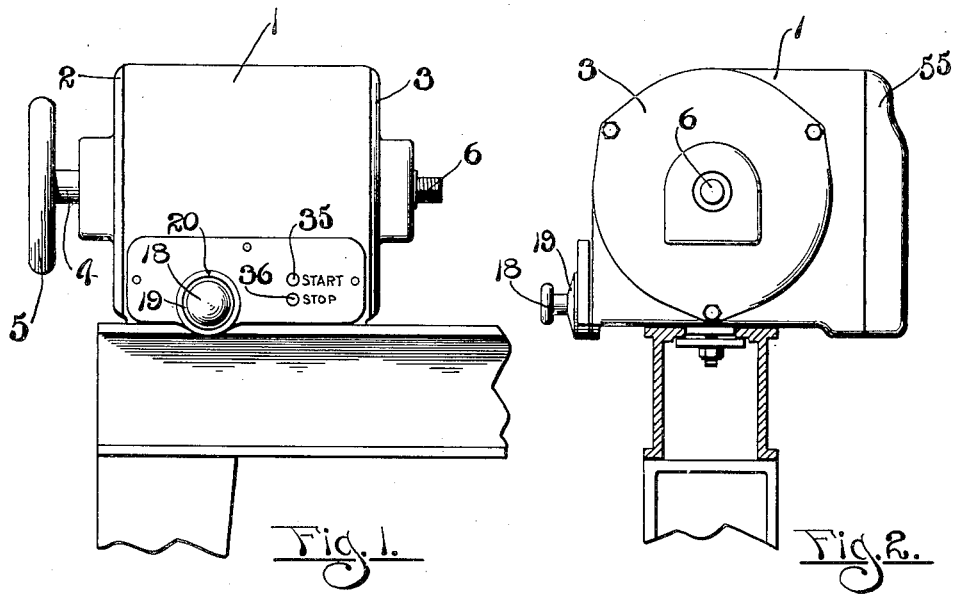
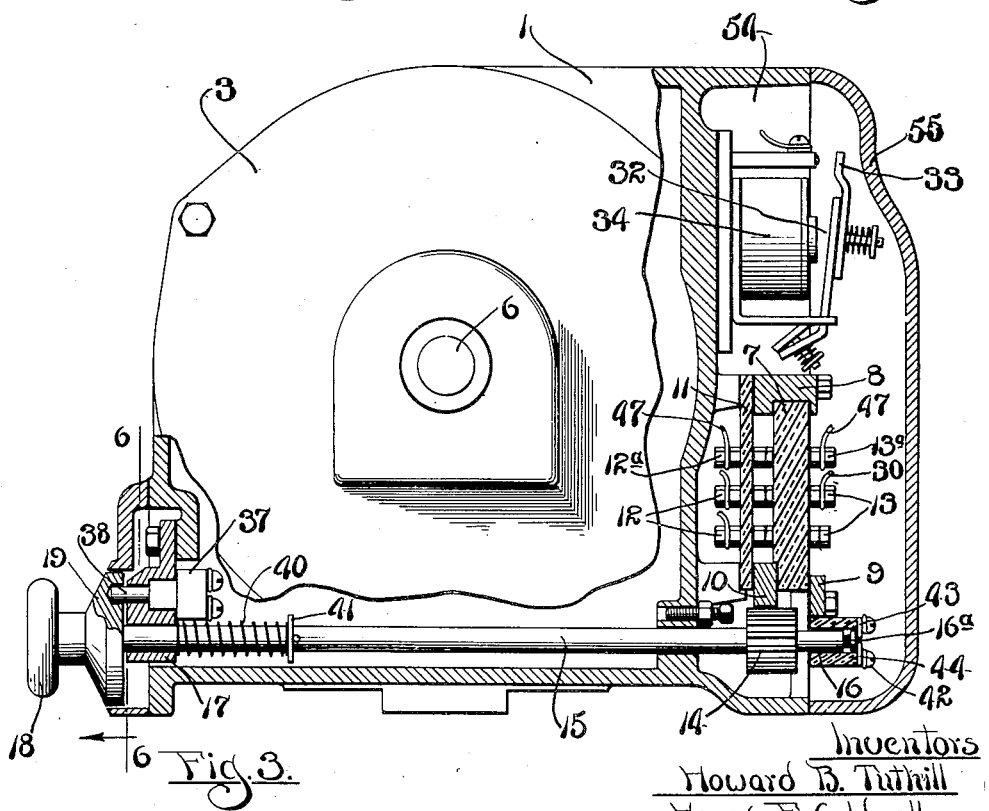

Inventors
Howard B. Tuthill
Harry F. Caldwell
By Livrance and Van Antwerp
Attorneys Patented Oct. 9, 1934

1,976,048

UNITED STATES PATENT OFFICE 1,976,048

MOTOR DRIVEN LATHE HEAD

Howard B. Tuthill and Harry F. Caldwell, Grand Rapids, Mich., assignors to Oliver Machinery Company, Grand Rapids, Mich., a corporation of Michigan Application December 28, 1931, Serial No. 583,588

18 Claims. (Cl. 172—179)

This invention relates to a motor driven lathe head and more particularly to such a device which may be considered as a single unit embodying an electric motor, a lathe spindle and all of the structure utilized to start and stop the motor and to control its speed of rotation, the unit being adaptable for location upon a suitable frame or lathe bed to perform its operation.

Although the unitary structure is particularly intended and adapted to be used as a lathe head in which case it must be complemented by a tail stock and other conventional lathe parts, it is also suitable for use for other purposes wherein any or all of its various qualities may be desirable.

The invention is particularly arranged for use in manual training schools where the operators are inexperienced and for that reason various safeguards to protect both the operator from injury and the mechanism from being damaged by abuse are desirable. Extreme compactness, especially as to vertical dimension, is also a very desirable feature in a machine of this type wherever it may be used and especially in a school-room where the instructor should have uninterrupted view of the whole shop in which many of the machines are located and furthermore low height of the device provides so-called "elbow room" for the operator and makes it possible for him to have greatest access to the work and especially when such work is located upon a face plate close to the casing of the machine.

The invention provides various novel features of construction and arrangement as hereinafter more fully described and particularly pointed out in the claims, reference being had to the accompanying drawings, in which, Fig. 1 is a front elevation of a lathe head embodying this invention shown in place on a fragmentary portion of a lathe bed.

Fig. 2 is an end view of the same showing the lathe bed in cross section.

Fig. 3 is an enlarged end view of the lathe head partially in cross section on the line 3—3 of Fig. 4.

Like numbers refer to like parts in all of the figures.

Figure 4:
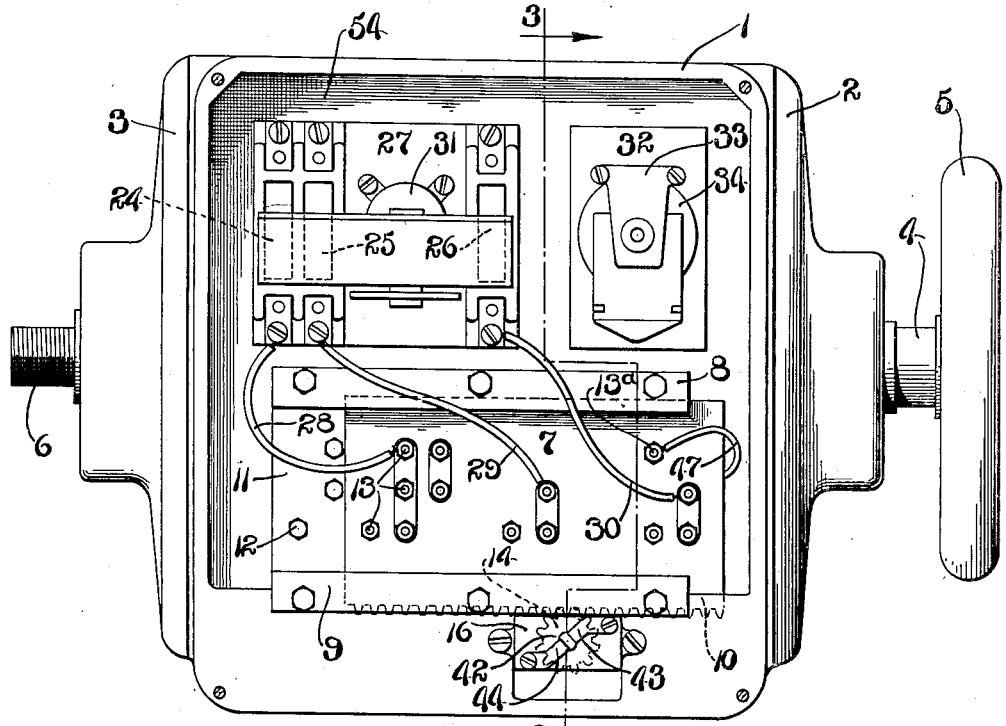
Fig. 4 is a rear elevation of the device with the cover removed illustrating some of the electric current control devices.
Figure 5:
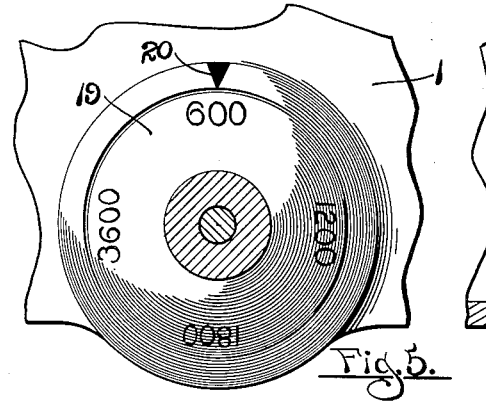
Fig. 5 is an elevation of the manually operated speed changer showing the dial and shaft with the knob removed.
Figure 6:
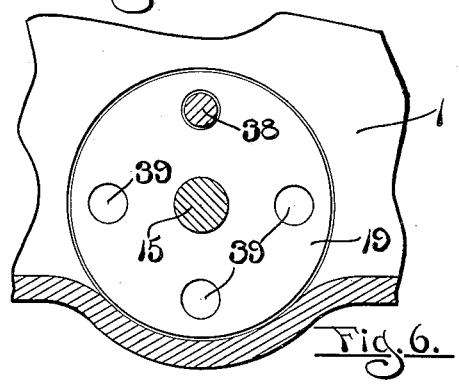
Fig. 6 is a rear view of the dial and certain co-acting parts on the line 6—6 of Fig. 3.

1 represents the motor housing which is also utilized as the frame or housing to support various other parts of the mechanism and it is provided with two end members 2 and 3 which carry the motor shaft bearings, said motor shaft 4 projecting at one end and being provided with a handwheel 5 and projecting at the opposite end through the member 3 where it is threaded at 6 to act as the lathe spindle. The motor proper, i. e. the armature, coils, brushes, etc., is not shown since the parts comprising it are conventional and well known. The motor is of the multi-speed type, the speed being controlled and varied by changing the electric circuits thereto by means of a so-called pole changer.

The pole changer used in the present structure is of the slide type comprising a slide member 7 mounted in guides 8 and 9 and formed of non-conductive material, the slide being in the shape of a flat plate and having a rack 10 attached to its lower edge. A fixed insulating plate 11 is located opposite the slide 7 and carries a plurality of groups of fixed contact members 12 while the slide 7 carries a plurality of contact members 13, various of the groups of contact members 12 on the fixed plate being engageable with other groups of the contact members 13 on the slide at different positions of the slide whereby different arrangements of electric circuits are obtained and by means of which different circuits the motor speed is varied. The present disclosure shows means for causing the motor to rotate at four different speeds as for example 600 R. P. M., 1200 R. P. M., 1800 R. P. M. and 3600 R. P. M. It is not important to describe the exact circuits used to change the speed of the motor inasmuch as such change of circuit is well known in the art, and it is to be understood that the contacts 12 are conventionally connected to the motor circuit to produce the desired results. However, it is considered important to the present invention that a slide type of pole changer is used as distinguished from the drum type which is more commonly used inasmuch as extreme compactness of structure is made possible thereby.

The slide 7 is moved in its guides by means of a pinion 14 mounted on a shaft 15, which shaft has a rear bearing 16 and a forward bearing 17. The shaft extends through the lower portion of the motor housing 1 and under the motor armature and at its forward end is provided with a knob 18 which has a dial 19 on which are indicated the various motor speeds and a pointer 20 on the casing adjacent the dial indicates the correct rotative position of the dial to cause the slide of the pole changer to be properly located for any of the desired motor speeds.

Figure 7:
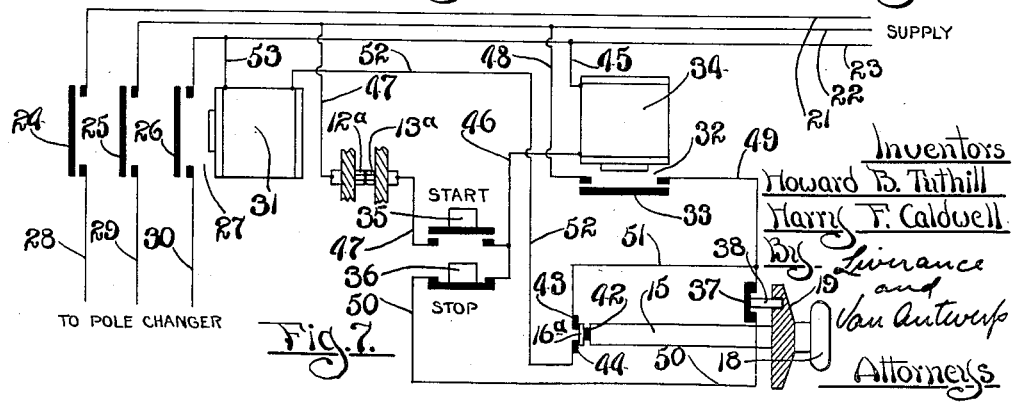
Fig. 7 is a diagram of the essential parts and conductors of the electric control means.

Referring to the diagram Fig. 7, which shows in diagrammatic form the essentials of the current control device, excepting the pole changer, the current is supplied by the conductors 21 and 22 and 23 which extend from the unit preferably in the form of a flexible cable and are suitably connected to a source of supply. These conductors extend to the three circuit closers 24, 25 and 26 of the large contactor 27 and conductors 28, 29 and 30 lead from the circuit closers 24, 25 and 26 to the proper connections with the contacts 13 on the slide 7. The circuit closers 24, 25 and 26 are simultaneously closed by action of a magnet 31. This type of contactor is of conventional form and its specific structure is not important to the present invention. A small contactor 32 having a single circuit closer 33 actuated by a magnet 34 is in the starting circuit and serves to maintain a current in the magnet 31 of the large contactor under certain conditions hereafter described.

A start switch and stop switch 35 and 36 respectively are used to start the motor or to stop it when desired. The stop switch will operate to stop the motor under any condition but the start switch can only operate to start the motor when other parts of the system are in proper condition to permit. A circuit breaker 37 is arranged adjacent the dial 19 and is provided with a slidable plunger 38, depression of which opens the circuit breaker. The rear face of the dial 19 is provided with openings 39 corresponding in number to the different speeds of the motor and located in positions to be entered respectively by the plunger 38 when the dial is in any of its proper positions to adjust the slide 7 of the pole changer for any of the four speeds of the motor. At positions of the dial intermediate any of its proper locations for any of the four speeds of the motor the plunger 38 will not be in position to enter one of the recesses 38 and therefore will be depressed to break the circuit at the circuit breaker 37 when the dial is moved to its inward position as hereafter described.

The shaft 15 on which the dial 19 is mounted may be slid longitudinally in its bearings, the width of the pinion 14 being sufficient to permit such sliding movement without unmeshing the teeth of the gear 14 from those of the rack 10, and a spring 40, surrounding the shaft and engaging the bearing 17 at one end and a collar 41 on the shaft at the other end, yieldably moves the shaft and the parts mounted on it rearwardly. A circuit breaker 42 is located at the rear end of the shaft 15 and is opened or closed by longitudinal movement of the shaft. The circuit breaker comprises the two contact members 43 and 44 mounted upon a sleeve 16. These contact members have spaced apart ends engageable by a conductor member 16a fixed to the end of the shaft 15 and insulated therefrom. The member 16a engages the members 43 and 44 and closes the circuit when the shaft 15 is in rearward position. A contact member 13a on the slide 7 and a contact member 12a on the plate 11 of the pole changer are utilized in the starting circuit, these contact members being in engagement only when the slide is in position to result in the lowest or 600 R. P. M. of the motor.

The various devices heretofore described are placed in circuit in the control system by various electrical conductors or wires as follows: One side of the magnet 34 of the small contactor 32 is in circuit with the supply conductor 23 by the wire 45 while the other side is in circuit with both the start and stop switch by the wire 46. The start switch is in circuit with the supply wire 22 by the wire 47, the contacts 12a and 13a being interposed in the wire 47 and circuit being complete in said wire only when said contacts are in engagement. The circuit closer 33 of the small contactor 32 is connected with the supply wire 22 by the wire 48 and the wire 49 leads from the circuit closer 33 to the circuit breaker 37 and a wire 50 extends between the circuit breaker 37 and the stop switch. A wire 51 branches from the wire 49 and leads to one of the contacts 43 of the circuit breaker 42 while a wire 52 leads from the other contact 44 and extends to one side of the magnet 31 of the large contactor 27. A wire 53 connects the opposite side of the magnet 31 with the supply wire 23.

The majority of the control parts heretofore described and also the sliding pole changer are located within a pocket 54 on the rear vertical side of the motor frame and enclosed by a removable cover 55 which gives convenient access to them and the parts not so located in said pocket are mounted on other parts of the motor frame and all of the conductor wires extending between the various parts are housed within some part of the frame so that the device is entirely a self-contained unit, the only part extending away from the unit being the flexible cable containing the supply conductors, 21, 22 and 23.

*Operation*

To start the motor the operator must first ascertain that the dial 19 is correctly positioned to adjust the pole changer for the proper circuits to operate the motor at the slowest or 600 R. P. M. speed. In this position the shaft 15 with the dial 19 fixed thereto is moved to its rearward position by the spring 40 and the conductor member 16a thereon engages the contact members 43 and 44 closing the circuit between them and the plunger 38 of the circuit breaker 37 enters one of the openings 39 on the rear of the dial 19, permitting the circuit breaker 37 to assume closed circuit position. In this position the slide of the pole changer will be located so that the contacts 12a and 13a are in engagement thus completing the circuit in the wire 47.

With the parts thus arranged the button of the start switch 35, which normally is in a circuit breaking position, is depressed, which closes its circuit and completes circuit from the supply wire 22 through the wire 47 and the wire 46 to one side of the magnet 34 the circuit being completed through the wire 45 to the supply wire 23 and thus energizes the magnet 34 which attracts the circuit closer 33 closing its circuit and completing circuit from the supply wire 22 through the wires 48, 49, 51, the circuit breaker 42, and the wire 52 to the magnet 31 of the large contactor, the circuit being completed by the wire 53 to the supply wire 23. Current energizing the magnet 31 simultaneously attracts all three of the circuit closers 24, 25 and 26 which respectively close the circuit to the wires 28, 29 and 30 leading to the pole changer and the contacts 12 and 13 of the pole changer complete the motor circuit causing the motor to rotate at low speed. Release of the start button permits it to assume its normal circuit breaking position but the circuit for the magnet 31 is maintained by the small contactor 32, the magnet 34 of which remains energized by reason of the closed circuits heretofore described.

When it is desired to cause the motor to operate at one of the greater speeds the operator rotates the dial 19 to the proper position for the desired speed as indicated by the numbers thereon registering with the arrow 20 but because of the plunger 38 entered into a recess 39 on the back of the dial such rotation cannot be effected until the dial has been drawn forward so as to be released from the plunger 38 and in so moving the dial forward the member 16a on the shaft 15 is removed from engagement with the contacts 43 and 44 of the circuit breaker 42 breaking the circuit at this location which interruption of the circuit de-energizes the magnet 31 of the large contactor and causes the circuit closers 24, 25 and 26 to disengage breaking the circuit to the pole changer and to the motor. An advantage of this interruption of current to the pole changer at the time its position is changed is that there is no current in the pole changer when the contacts 12 and 13 thereof are moved from one position to another and therefore there can be no arcing between the contacts during the change of position, the extreme desirability of which is most evident to anyone skilled in the art.

It will be noted that the circuit to the magnet 34 of the small contactor is not interrupted by breaking the circuit at the circuit breaker 42, the said magnet circuit being maintained through the wire 48, the circuit closer 33, the wire 49, the circuit breaker 37, the wire 50, the stop switch 36 and the wire 46, the stop switch being normally in closed circuit position. When the dial has been rotated to its proper position for a higher speed of the motor it is permitted to be moved rearwardly and the plunger 38 will enter an opening 39 in the back of the dial and member 16a on the shaft 15 will again close the circuit at the circuit breaker 42 again completing the circuit to the magnet 31, which when energized closes circuit at the three circuit closers 24, 25 and 26 and again completes the circuit to the pole changer and thence to the motor which takes up its operation at a higher speed because of the different circuits provided by the changed position of the pole changer. The change of speed from the lowest speed to any of the higher speeds is accomplished exactly as heretofore described and the speed of the motor may be reduced from any of its higher speeds to a lower speed by the same operation, it being only necessary, after the circuit has been originally established at the lowest speed, to move the dial forward and rotate it to the proper position for the speed desired and return it rearwardly to its normal position.

Should the operator release the dial in any position intermediate its correct speed positions the plunger 38 of the circuit breaker 37 will fail to enter a recess 39 but will engage the rear face of the dial and be thrust inwardly by rearward movement of the dial thus breaking the circuit at the circuit breaker 37 which will deenergize the magnet 34 of the small contactor 32 and cause the circuit closer 33 to move to circuit breaking position and as the small contactor controls the circuit to the large contactor the magnet 31 of the large contactor will also be deenergized releasing the circuit closers 24, 25 and 26 and breaking the circuit to the motor. This means prevents tendency of the motor to operate or the current to flow through the circuits when the parts are not in accurately adjusted speed positions. After the circuit has thus been broken by opening the circuit closer 37 the motor may not again be started excepting as first described for starting at the lowest speed. In other words, the pole changer will have to be moved to its position for lowest speed so that the contacts 12a and 13a will be in engagement to supply current to the start button which is utilized to close the small contactor.

The stop switch, which is normally closed, is in the same circuit as the circuit breaker 37 and depression of the stop button opens the circuit at the switch and deenergizes the magnet 34 of the small contactor with the same result as heretofore described when the circuit breaker 37 is opened and it is evident that the stop button may be used to instantly break the motor circuit under any condition and in any position of the control parts.

The device as shown and described causes the operator first to start the motor rotation at its lowest speed which has an obvious advantage of avoiding undue strain in attempting to rotate the armature from rest immediately at a high speed which would be injurious to both mechanical and electrical mechanisms of the structure. After the armature has attained a momentum at its lowest speed its speed may be increased at will provided that the control parts are properly adjusted for the desired speed. It is also possible to vary operation of the motor to any of its speeds after it has first been started at low speed and in changing from any speed to another it is not necessary to establish operation of the motor at any of the intermediate speeds. In other words, the change of speed is thoroughly selective as may be distinguished from progressive and the speed of the motor for example may be changed from 600 R. P. M. to 3600 R. P. M. or vice versa without operating it at the intermediate speeds of 1200 and 1800.

Breaking the circuit at the circuit breaker 42, which actuates to open the large contactor 27, during change of position of the pole changer for the various speeds, prevents arcing of the current at the pole changer contacts, which arcing would be decidedly undesirable for various reasons well understood by anyone skilled in the art.

It is impossible to leave the device with current passing through any part of it unless the motor is in operation because when the knob and dial 18 and 19 are released by the operator, if they are not in proper position to cause the motor to operate at one of its speeds, the plunger 38 will be engaged by the rear side of the dial and will open the circuit breaker 37 which breaks the circuit to the magnet 34 of the small contactor and discontinues flow of current in any part of the device making it necessary to properly reset the device and to intentionally close the start switch 35 before flow of current is again resumed and before the motor will operate. One of the principal advantages of this arrangement is safety to the operator, as distinguished from previous devices with which a careless operator could cease operation of the motor by turning the pole changer to an intermediate position and in which the motor could be caused to resume operation merely by moving the pole changer to a closed circuit position which could easily result in an operator inadvertently striking the pole changing knob and moving it to a position to start the motor while his hands were in a dangerous position on the work. With the present device if the motor is not running it can only be made to run by intentionally adjusting the parts to their proper positions and pushing the button of the start switch.

An additional advantage of the machine which breaks the circuit to any part of the device when the parts are set in incorrect speed positions is that the device may not be left for a long period of time with current flowing through any part of it which obviates the possibility of damage by overheating which could otherwise occur.

The compact arrangement of the parts which is accomplished by means of the flat slide type pole changer located in a position at the back of the motor housing and operated by the shaft 15 which extends through the lower part of the motor housing to the front of the machine is productive of a device which is extremely low in vertical dimension and especially vertical dimension above the axis of the motor shaft. The advantages of this low structure, as heretofore mentioned, are that visibility in a room in which many of the machines are located is comparatively unimpaired and also that the operator in working close to the face plate of the lathe may have ample room to move his arms or body above the device.

The location of the control knob and dial at the front side of the machine and in a low position adds materially to the compactness and convenience of operation of the device and the combination of the circuit breaker 42 operated by longitudinal movement of the shaft 15 whereby the control movements are co-related extremely simplifies both the construction of the device and its operation.

Having thus described our invention we desire it to be understood that the invention is in no wise limited to the particular illustrative embodiment disclosed, the scope thereof being set forth in the following claims.

We claim:

1. A device of the class described comprising, a variable speed electric motor, a manually operated pole changer electrically connected with said motor whereby the electric circuits may be varied to vary the speed of rotation of the motor, means for closing an electric circuit to said pole changer, and means to automatically break the circuit to said pole changer when said pole changer is in any position other than an accurate speed position.

2. A device of the class described comprising a variable speed electric motor, a manually operated pole changer electrically connected with said motor for the purpose of controlling electric circuits to vary the speed of rotation of said motor, and means for closing an electric circuit to said pole changer and for breaking said circuit to said pole changer while the pole changer is being moved from one position to another.

3. A device of the class described comprising, a variable speed electric motor, a manually operated pole changer electrically connected with said motor for the purpose of controlling electric circuits to vary the speed of rotation of said motor, means for closing an electric circuit to said pole changer and for breaking said circuit to said pole changer while the pole changer is being moved from one position to another, and means for breaking said circuit to said pole changer when the pole changer is in any of its positions excepting an accurate speed position.

4. A device of the class described comprising, a variable speed electric motor, a pole changer electrically connected with said motor for the purpose of controlling electric circuits to vary the speed of rotation of said motor, means for closing an electric circuit to said pole changer, means for breaking said circuit to said pole changer while the pole changer is being moved from one position to another, and means to prevent closing of said circuit to the pole changer excepting when the pole changer is in a position to cause the motor to be actuated at a predetermined speed.

5. A device of the class described comprising, a variable speed electric motor, a pole changer electrically connected with said motor to control electric circuits whereby the speed of rotation of the motor may be varied, a source of electric current, a large contactor for closing a circuit for said electric current to said pole changer, a small contactor having a circuit closer connected with said current source and adapted to close a circuit to said large contactor whereby the large contactor is caused to close its circuit, a start switch in circuit with said current supply and with said small contactor whereby current may be supplied to the small contactor to cause it to close its circuit, and means in the start switch circuit which prevents closing of said start switch circuit excepting when said pole changer is in a position to cause the motor to operate at a predetermined speed.

6. A device of the class described comprising, a variable speed electric motor, a pole changer electrically connected with said motor to control electric circuits whereby the speed of rotation of the motor may be varied, a source of electric current, a large contactor for closing a circuit for said electric current to said pole changer, a small contactor having a circuit closer connected with said current supply and adapted to close a circuit to said large contactor whereby the large contactor is caused to close its circuit, a start switch in circuit with said current source and with said small contactor whereby current may be supplied to the small contactor to cause it to close its circuit, and means in the small contactor circuit to open said circuit when the pole changer is in any position excepting an accurate one.

7. A device of the class described comprising, a variable speed electric motor, a pole changer electrically connected with said motor to control electric circuits whereby the speed of rotation of the motor may be varied, a source of electric current, a large contactor for closing a circuit for said electric current to said pole changer, a small contactor having a circuit closer connected with said current source and adapted to close a circuit to said large contactor whereby the large contactor is caused to close its circuit, a start switch in circuit with said current supply and with said small contactor whereby current may be supplied to the small contactor to cause it to close its circuit, means in the start switch circuit which prevents closing of said start switch circuit excepting when said pole changer is in a position to cause the motor to operate at a low speed, means for maintaining the small contactor in closed position, and means for breaking the circuit to the large contactor while the pole changer is being changed from one position to another.

8. A device of the class described comprising, a variable speed electric motor, a pole changer electrically connected with said motor to control electric circuits whereby the speed of rotation of the motor may be varied, a source of electric current, a large contactor for closing a circuit for said electric current to said pole changer, a small contactor having a circuit closer connected with said current source and adapted to close a circuit to said large contactor whereby the large contactor is caused to close its circuit, means for breaking the large contactor circuit while the pole changer is being changed from one position to another and means for maintaining the small contactor circuit during the change of position of the pole changer.

9. A device of the class described comprising, a variable speed electric motor, a pole changer electrically connected with said motor to control electric circuits whereby the speed of rotation of the motor may be varied, a source of electric current, a large contactor for closing a circuit for said electric current to said pole changer, a small contactor having a circuit closer connected with said current source and adapted to close a circuit to said large contactor whereby the large contactor is caused to close its circuit, means for breaking the large contactor circuit while the pole changer is being changed from one position to another, means for maintaining the small contactor circuit during the change of position of the pole changer, and means for breaking the small contactor circuit retaining means if the large contactor circuit breaking means is closed while the pole changer is in another than accurate position.

10. A device of the class described comprising, a variable speed electric motor capable of three different speeds, a pole changer electrically connected with said motor whereby the speeds of the motor may be varied, manual means for moving the pole changer from one position to either of the other positions, means for closing an electric circuit to said pole changer and means automatically operated by said manual pole changing means for breaking the circuit to said pole changer while the pole changer is being changed from one position to another.

11. A device of the class described comprising, a variable speed electric motor, a pole changer electrically connected with said motor whereby the speed of rotation of the motor may be varied, manual means for moving the pole changer from one position to another including a rotatable and longitudinally movable shaft, means requiring longitudinal movement of the shaft to permit rotation thereof to move the pole changer, a circuit breaker actuated by longitudinal movement of the shaft, means for closing an electric circuit to said pole changer, said means being caused to open said pole changer circuit by actuation of said shaft actuated circuit breaker.

12. A device of the class described comprising, a variable speed electric motor, a pole changer electrically connected with said motor whereby the speed of rotation of the motor may be varied, manual means for moving the pole changer from one position to another including a rotatable and longitudinally movable shaft, a member fixed to said shaft and having recesses corresponding in number to the different positions of the pole changer, a plunger extendible into the respective recesses at various positions of said member and pole changer and arranged to require longitudinal movement of the shaft and member for disengagement from the plunger to permit rotation of the shaft and member, means for closing an electric circuit to said pole changer, said means being caused to break said pole changer circuit upon depression of said plunger, said plunger being depressed by engagement of said member intermediate the recesses thereof and upon longitudinal movement of said shaft.

13. A device of the class described comprising, a variable speed electric motor, a pole changer electrically connected with said motor whereby the speed of rotation of the motor may be varied, manual means for moving the pole changer from one position to another including a rotatable and longitudinally movable shaft, a member fixed to said shaft and having recesses corresponding in number to the different positions of the pole changer, a plunger extendible into the respective recesses at various positions of said member and pole changer and arranged to require longitudinal movement of the shaft and member for disengagement from the plunger to permit rotation of the shaft and member, means for closing an electric circuit to said pole changer, said means being caused to break said pole changer circuit upon depression of said plunger, said plunger being depressed by engagement of said member intermediate the recesses and upon longitudinal movement of said shaft, and a circuit breaker and electric connections therewith actuated by longitudinal movement of said shaft, said circuit breaker and electric connections being arranged to break the circuit to the pole changer when the shaft is moved longitudinally to disengage the said plunger from the said member.

14. A device of the class described comprising, a variable speed electric motor having a housing, a pole changer comprising two vertical parallel members one of which is slidable relative to the other, said pole changer being mounted on the rear vertical side of said housing, means for sliding the slidable member of said pole changer comprising a shaft extending through the motor housing beneath the armature of said motor and having means at its rear end for moving said slide by rotation and having a manual operating member at its front end located at the front side of the motor housing near the bottom thereof and suitable electric connections between a source of electric supply and said pole changer combined with suitable devices for making and breaking the electric circuit to the pole changer, all of said devices being mounted upon the motor housing as a single unit.

15. A device of the class described comprising, a variable speed electric motor having a housing, a pole changer including a slide member adapted to be slid to different positions for the purpose of making different electrical contacts, said pole changer being mounted on the rear side of said housing, a shaft extending through said housing from the front to rear thereof and under the armature of said motor, said shaft being mounted for rotation and longitudinal movement, means at the rear end of said shaft associated with the slide of said pole changer for moving said slide by rotation of said shaft in any of its longitudinal positions, an electric switch actuated by longtudinal movement of the shaft being moved to closed position when the shaft is rearward and to open position when the shaft is forward, means for yieldably moving said shaft rearward, manual means at the forward end of said shaft for both rotating it and moving it longitudinally, means associated with said shaft requiring forward movement thereof to permit rotation of the shaft from any of its normal rotative positions, suitable devices for closing a circuit to said motor through said pole changer, and means actuated by said switch for breaking said circuit when the switch is open and for closing said circuit when the switch is closed, all of said devices being located upon the motor housing as a single unit.

16. A device of the class described comprising, a variable speed electric motor having a housing, a pole changer including a slide member adapted to be slid to different positions for the purpose of making different electrical contacts, said pole changer being mounted on the rear side of said housing, a shaft extending through said housing from the front to rear thereof and under the armature of said motor, said shaft being mounted for rotation and longitudinal movement, means at the rear end of said shaft associated with the slide of said pole changer for moving said slide by rotation of said shaft in any of its longitudinal positions, an electric switch actuated by longitudinal movement of the shaft being moved to closed position when the shaft is rearward and to open position when the shaft is forward, means for yieldably moving said shaft rearward, a member fixed to the front of said shaft having recesses corresponding to the different positions of the pole changer, a second switch located adjacent said member and having an actuating plunger normally extending into one of the respective recesses therein, said switch being closed when the plunger is extended and open when the plunger is depressed, suitable devices for closing an electric circuit to the motor through the pole changer, and means actuated by either of said switches for breaking said circuit when either of said switches is opened, all of said devices being mounted on the motor housing as a single unit.

17. In combination, an integrally formed housing having a relatively large compartment and a relatively small compartment with a wall therebetween, said large compartment having open ends and said small compartment having an opening opposite the said wall, end plates for said open ends, an electric motor located in said large compartment and having its bearings located in said end plates, a pole changer mounted within said small compartment, electrical connections between the motor and the pole changer and a revoluble shaft adapted to operate the pole changer, said shaft being mounted in said integral wall and extending through the large compartment and underneath the rotor of the said motor.

18. A combination of elements as set forth in claim 17 in which the pole changer includes a flat plate having a rack fastened thereto and said shaft has a small gear thereon meshing with said rack whereby the plate may be translated.

HOWARD B. TUTHILL.
HARRY F. CALDWELL.